United States Patent [19]

Serley

[11] 4,170,132
[45] Oct. 9, 1979

[54] AIRSPEED AND RELATIVE DIRECTION INDICATOR

[75] Inventor: James E. Serley, Bloomington, Minn.
[73] Assignee: Rosemount Inc., Eden Prairie, Minn.
[21] Appl. No.: 861,102
[22] Filed: Dec. 16, 1977
[51] Int. Cl.² ............................................. G01C 21/10
[52] U.S. Cl. ..................................... 73/178 T; 73/189
[58] Field of Search .................. 73/189, 178 R, 178 T

[56] References Cited

U.S. PATENT DOCUMENTS

| | | | |
|---|---|---|---|
| 764,759 | 7/1904 | Owen | 73/189 |
| 2,375,227 | 5/1945 | Hillman | 73/189 |
| 2,586,010 | 2/1952 | Divoll | 73/189 |
| 3,446,070 | 5/1969 | Hickox | 73/189 |

*Primary Examiner*—Jerry W. Myracle
*Attorney, Agent, or Firm*—Kinney, Lange, Westman and Fairbairn

[57] ABSTRACT

A meter face arrangement for use with a cross wind sensor that provides information indicating relative airspeed with respect to a probe, and also the direction of the relative wind, which permits an operator of an aircraft such as a helicopter pilot or an operator of a levitated vehicle or an observer in a ground installation to determine the relative movement of the air and also the relative direction of movement. The meter face is made so that the indicator will visually provide the direction and speed information from a single meter location using standard indicating hands to prevent confusion of the user.

2 Claims, 2 Drawing Figures

AIRSPEED AND RELATIVE DIRECTION INDICATOR

BACKGROUND OF THE INVENTION

1. Field of the Invention

The present invention relates to a meter indicator face that provides relative airspeed and relative direction of airflow with respect to a sensing probe.

2. Prior Art

Cross wind sensors, that is, sensors which provide information that can be used for determining the speed of the wind in two orthogonal directions, are well known in the art, and for example, U.S. Pat. No. 3,646,811 illustrates such a probe. In U.S. Pat. No. 3,646,811 the airspeed in two orthogonal directions is being indicated. It has been well known to obtain airspeed components in two orthogonal directions being measured, and then resolve these values and arrive at a resultant direction with respect to a reference line.

U.S. Pat. No. 4,044,709 issued to David L. Green on Aug. 30, 1977 for a Omnidirectional Speed Cockpit Display. The display utilizes cross bars and separate pointers which move in orthogonal directions to indicate relative speed in such directions. In one form a pointer operating along a vertical scale indicates the vector sum of the airspeed, which sum is also displayed in the present device with one rotating needle pointer.

SUMMARY OF THE INVENTION

The present invention relates to a meter or display arrangement for displaying relative wind velocity and direction with respect to a probe mounted on an aircraft or other object movable through the air or the display of wind information relative to a fixed ground station location. The meter displays the information through the use of a pair of co-axial meter needles, one of which indicates direction of airflow relative to the object, such as a helicopter, and the other which indicates velocity of the flow.

The sensor and meter display find particular usefulness in airborne applications where there may be omni or semi-omnidirectional motion relative to the air mass such as with a helicopter, a vertical takeoff aircraft or short takeoff and landing aircraft, a surface effect machine such as a levitated vehicle, and also in cockpit displays of aircraft displaying local conditions surrounding the aircraft just prior to departure.

The meter display as shown is a two needle display, one indicating airspeed and the other indicating direction. In the case of aircraft display, the directional display is made so that it is oriented with the normal fore and aft axis of the craft being represented vertically, and the indicator needle follows right-left directions for indicating the relative wind direction. The display thus is somewhat similar to standard ADF displays used in aircraft. The airspeed needle operates as conventional airspeed needles with which a pilot is familiar. The needle representations allow for rapid interpretation of both direction of change and rate of change of the parameter, giving the pilot anticipation clues for proper maneuvering of the aircraft. In ground installations, the directional markings on the face of the indicator will be marked with reference to north or another reference direction, allowing ground observers to read both magnitude and direction of the wind from a single display.

DESCRIPTION OF THE PREFERRED EMBODIMENT

Figure 1:
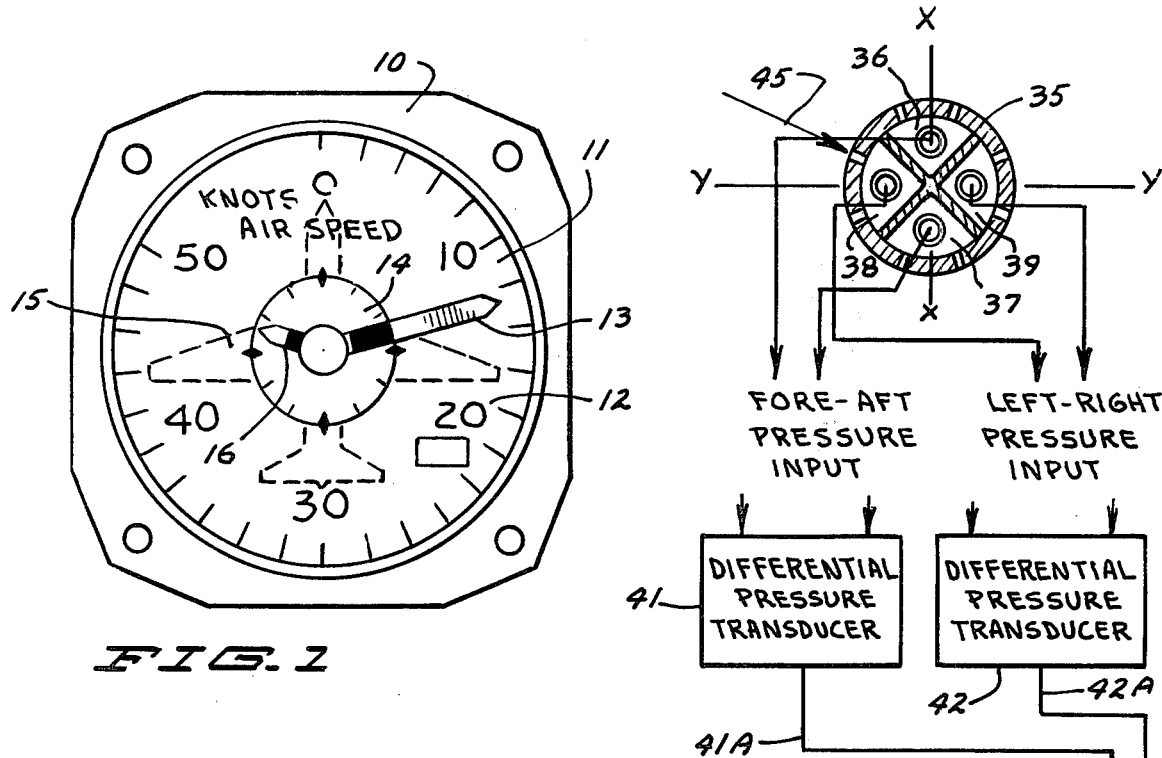
FIG. 1 is a front view of an airspeed and direction indication instrument showing indicator needles mounted in a display for aircraft applications made according to the present invention.

A visual airspeed and direction indicator or display meter is indicated generally at 10 and is shown mounted onto a panel of an aircraft, another airborne craft or ground installation which is using the device, such as a helicopter, a levitated vehicle, or ground meteorological station. The display includes a face panel 11 that is mounted substantially vertically and has an outer set of calibrated numerals indicated generally at 12 indicating the speed of the air movement with respect to the vehicle installation, as sensed by a probe mounted on the vehicle installation. These numerals 12 are indicated by a first needle or pointer 13 having an outer end adjacent to these numerals.

A smaller diameter inner indicia is provided on the face panel 11 and arranged annularly as indicated at 14. The indicia 14 represents a compass rose oriented to indicate direction with respect to the representation of the craft or installation indicated at 15, in this case a vertical takeoff and landing aircraft configuration. A shorter indicating needle or pointer 16 is used to indicate relative direction of wind or airflow in association with the indicia 14 and the representation of the craft 15. Needle 16 points in the direction from which the relative wind is coming. In the representation shown in FIG. 1, the relative wind is from the left and slightly ahead (about the 10:00 o'clock position). If the needle 16 was pointing straight up, the wind would be coming from straight ahead of the craft, and if the needle was pointing down, the relative wind would be coming from the rear of the craft. This orientation is similar to the orientation of needles in ADF equipment used for navigation purposes at the present time in aircraft.

In fixed or stationary installations the display face 11 could be oriented horizontally with "North" (a compass direction relative to the earth) properly located for a reference. If installed vertically in a fixed installation, North would generally be straight up.

Figure 2:
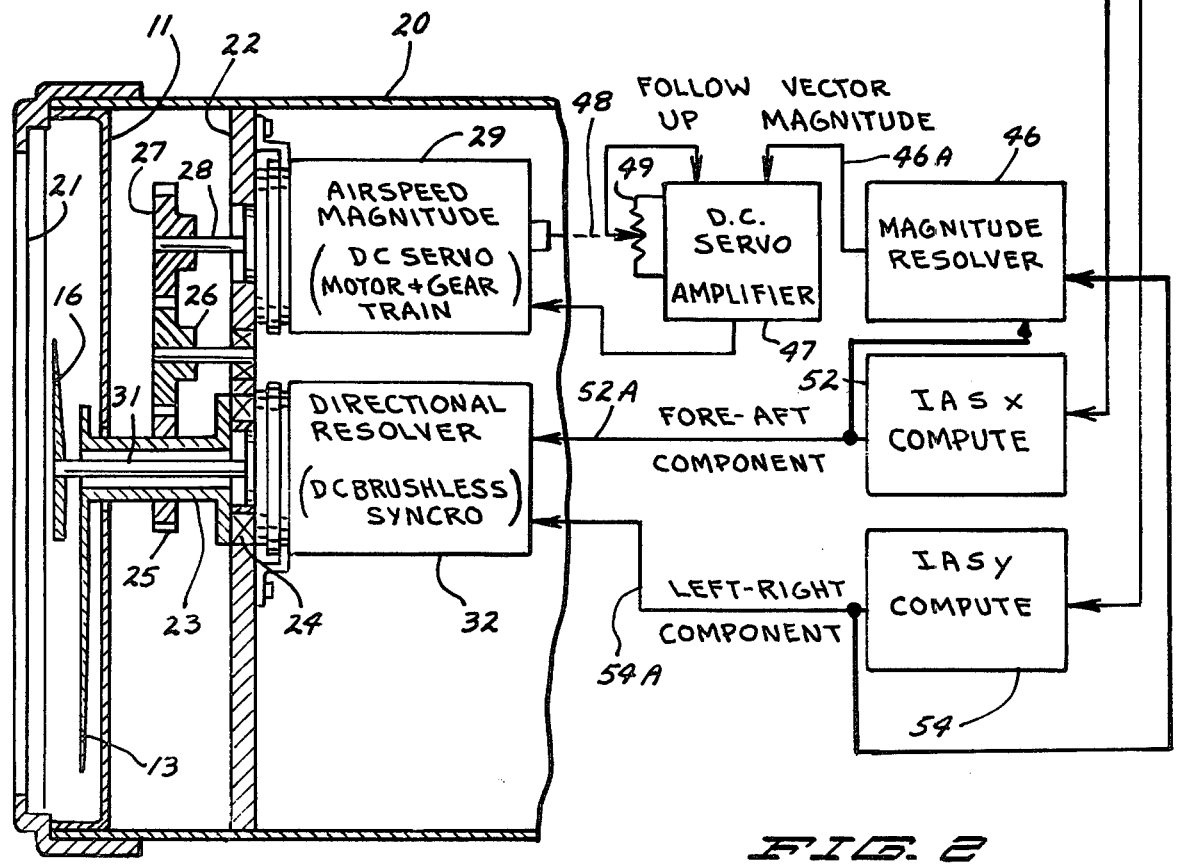
FIG. 2 is a schematic representation of a typical probe and conventional airspeed measurement system showing the two needle configuration of FIG. 1 shown in section.

Referring to FIG. 2, and the cross section of the display meter 10, the meter has a case 20 which comprises an outer housing, and an outer transparent cover 21 that shields the face panel 11, and needles and the like from the atmosphere. The case also includes a bulkhead 22 positioned behind the face panel 11. The front of the face panel 11 is shown in FIG. 1, and carries the indicia that was previously described.

The outer airspeed indicating needle 13 is fixedly mounted onto a sleeve 23 which in turn is mounted onto a bearing 24 so that it will rotate relative to the bulkhead 22. The sleeve 23 drivably carries a gear 25, and gear 25 serves to rotationally drive the sleeve 23 and the needle 13. An idler gear 26 is mounted onto the bulkhead on a suitable shaft, and the gear 26 driveably engages gear 25. The gear 26 in turn is driven by a gear 27 that is mounted to an output shaft 28 of the airspeed meter drive motor 29. The meter drive motor is operated by an electrical signal proportional to the airspeed sensed from a suitable probe in a known manner. A geared, servo driven motor of conventional design may be used.

The needle 16, which is the relative direction indicating needle, is mounted onto a shaft 31 which comprises the output of a directional resolver 32. This directional resolver is shown as a DC brushless synchro that rotates the needle 16 in accordance with a pair of input signals one of which represents the fore and aft component of the wind and the other of which represents the left right component of the wind. A geared, servo driven needle similar in design to an airspeed magnitude motor and gear train can also be utilized to drive the relative direction needle 16. The DC brushless synchro is mounted onto the bulkhead 22 in a desirable manner such as with metal clips and is not attached to the bearing 24. Thus, the DC brushless synchro housing does not rotate, but the output shaft 31 will rotate in accordance with the input signals. A model 11PTD-10E DC brushless synchro made by Clifton Precision Products, Clifton Heights, Penn. 19018 has been found to be satisfactory.

It can therefore be seen that the direction indicating needle 16 and the airspeed indicating needle 14 are concentric, and each provides a display directly on the same meter face and relative to the same face to permit rapid visual comprehension of the existing relative wind conditions.

The details of an appropriate sensing probe and the various equations for resolving the fore and aft airspeed component and the left-right airspeed component, as well as the equation for determining the vector or direction of the resultant airflow are shown and explained in Column 3 of U.S. Pat. No. 3,646,811. Also, the internal workings of a typical probe is illustrated in U.S. Pat. No. 3,646,811 and the upper portions of FIG. 2 of this application contains a cross section of a probe similar to FIG. 3 of U.S. Pat. No. 3,646,811.

The probe 35 is made so that it is divided into four chambers as shown. A forward chamber 36, and a rear chamber 37 are centered along an X—X or fore and aft axis. The chambers include ports permitting air pressure to be sensed in the chambers along the fore and aft axis. The probe also has lateral chambers 38 and 39 which are sealed from each other and the other chambers 36 and 37, and have ports leading to the atmosphere so that the pressure along a Y—Y axis or the left-right axis is sensed. In order to determine the airspeed vector, the differentials in pressures between the chambers 36 and 37, for airspeed and direction along the X—X axis, and between chambers 38 and 39, for airspeed and direction along the Y—Y or left-right axis are utilized.

Separate differential pressure transducers indicated generally at 41 and 42 are utilized. Signals are provided on lines 41A and 42A respectively, each of which signals is proportional to the differential in pressure between the chambers in the respective pairs of chambers. In other words, the signal along line 41A is representative of the differential in pressure between chambers 36 and 37, and the signal along line 42A is representative of the differential in pressures between chambers 38 and 39. It should be noted that the sign (plus or minus) of the signals along lines 41A and 42A will also indicate direction. If the relative wind indicated by arrow 45 is from the left, the signal along line 42A will be negative while if it is from the right the signal will be a positive signal. If the relative wind indicated by arrow 45 is from a direction forwardly of the Y—Y axis of the probe the signal along line 41A will be positive, while if the relative wind is from the rear, the signal on line 41A will be negative.

The directional indicator which provides for the drive to needle 16 that indicates the relative direction of the wind sensed at the probe 35 utilizes a computation circuitry 52 for determining the indicated airspeed along the X axis. This utilizes the signal on line 41A, which is a differential pressure signal indicating differential pressure between chambers 36 and 37. The circuitry 52 is a square root extraction circuit which provides the velocity as indicated in the equation (1c) in Column 3, line 38 of U.S. Pat. No. 3,646,811. This output signal is provided along line 52A, and is representative of the magnitude of the airspeed along the X—X or fore and aft axis.

Circuitry 54 is used to compute the airspeed along the Y—Y axis, and is represented by equation (2c) in Column 3, line 39 of U.S. Pat. No. 3,646,811. Square root extraction circuitry is used in circuit 54 as well. An electrical signal is provided along line 54A which is proportional to the vector of the relative airspeed along the Y—Y or left-right axis. The signals along lines 52A and 54A, which represent the vectors of the airflow along the fore-aft and left-right axes, respectively, as shown are provided to the separate inputs of a DC brushless synchro which resolves the input for the X—X and Y—Y axes into a resultant indication that represents the direction of the relative wind indicated by arrow 45, on the needle 16.

A magnitude resolver circuit 46 receives the output from circuits 52 and 54 and provides an output signal along line 46A that is representative of equation (3c) shown on line 40 of Column 3 of U.S. Pat. No. 3,646,811. This circuitry is well known in the art, and adds the two signals from the square root extraction circuits 52 and 54 and by utilizing a suitable constant, the magnitude of the wind is provided as an electrical signal along 46A. This signal is fed into a DC servo amplifier 47. The servo amplifier in turn drives the servo motor and gear train indicated at 29 which provides drive to needle 13 to indicate the airspeed magnitude relative to probe 35. A suitable feedback 48 in the normal manner is used for a follow up signal, and the sensitivity can be adjusted with a potentiometer 49. Thus, the drive to the outer airspeed indicating needle is straight-forward, well known in the art and utilizes a probe also known in the art.

The same type of DC servo motor drive as just described may be utilized for driving needle 16, if desired, in place of the DC brushless synchro.

A visual display is thus provided wherein one needle 13 indicates the airspeed directly on the mter face in a normal manner, and on the same meter face, and concentric with the needle 13, a needle 16 indicates the relative direction of airflow with respect to the aircraft, vehicle, or fixed installation.

In the past, two separate meters or a meter utilizing crossed pointers, similar to the CDI/ILS indicators have been used for display of the same information. With two separate meters, one meter would indicate the relative airspeed at probe 35 and another meter or indicating needle would indicate the wind direction. This leads to confusion in visual orientation of an operator or pilot, and does not provide the information of both airspeed and direction readily. With the cross-pointer type display, one pointer would indicate the fore-aft component and the other would indicate the left-right component. Visual resolution of the components is required with that type instrument, and the display of that instrument, while looking like other currently utilized cockpit instruments, requires drastically different interpretation, thus leading to human factor problems.

A critical time for determining the airspeed and relative direction in a vertical takeoff aircraft or in a helicopter is when one is closed to or on the ground. If the airspeed direction indicates that the relative motion of the vehicle through the air mass is excessive with respect to the vehicle's relative motion over the ground, the pilot would be made aware of this so that proper compensation can be made as required. The display is visually oriented so that the small needle 16 indicates the relative direction of the wind as oriented on the meter face so that straight up is straight ahead of the aircraft or vehicle, and right and left are properly oriented on the meter face, and straight down on the needle indicates to the rear of the aircraft.

The various scales of airspeed, of course, can be easily modified to fit the needs, and even on high speed aircraft the sensor can be utilized for initial reference immediately before takeoff to see whether there is a cross wind component, and to see the magnitude of such component so that takeoffs can be conducted in a safe manner.

The probe 35 may be mounted in any convenient location on the structure or location with respect to which relative wind is measured and, of course, the probe is mounted in the proper orientation for sensing. The disclosed meter display has several advantages including ease of transition by pilots from current displays. Also the display provides ease in determining both magnitude and direction from a single instrument face. The needle presentation allows rapid interpretation of both the direction of relative wind change and rate of change of the relative wind (i.e., airspeed increasing or decreasing at increasing or decreasing rates) giving the pilot anticipation clues for precise operation.

Normal conventional drive mechanisms can be utilized (synchro, d'Arsenval, servo, etc.). The display can be illuminated as required for various applications. When being driven by airspeed measurement systems such as the orthogonal airspeed system made by Rosemount Inc., Eden Prairie, Minn. (Model 853 Series Probes and 542 Series Transducers) the indicator will provide accurate airspeed information throughout the entire range from zero to full scale airspeed.

What is claimed is:

1. An apparatus for installation in an aircraft for providing a single visual display of the direction of airflow relative to the fore and aft axis of the aircraft and also the speed of airflow relative to a sensor mounted at a desired location comprising a face panel fixed in the aircraft including an annular array of first indicia indicating increasing relative airflow speed in clockwise direction from a zero reference point on a desired axis of the face panel, a first pointer needle rotatably mounted relative to the face panel for association with said first indicia, means coupling the sensor to the first pointer needle to rotate the first pointer needle in response to measured airflow speed values relative to said face panel and said first indicia, a second pointer needle rotatably mounted with respect to the face panel, about a substantially central axis on the face panel, means responsive to sensed airflow at the sensor and coupled to the second pointer needle to rotate the second pointer needle to indicate relative direction of airflow at said sensor with respect to the aircraft fore and aft axis, and second indicia representing a known aircraft configuration fixed on said face panel and separately identifiable from said annular array of first indicia and associated with said second pointer needle, said second indicia being oriented so the known aircraft configuration fore and aft axis corresponds to the fore and aft axis on the aircraft in which the face panel is mounted, and the zero reference point for the first indicia is aligned with the leading end of the known aircraft configuration to provide direct indication of the relative direction of airflow with respect to the known aircraft configuration.

2. The apparatus as specified in claim 1 in combination with a sensor comprising a single probe having means for determining fluid flow speed along orthogonal axes oriented so that one of said orthogonal axes extends along said reference direction axis.

* * * * *

UNITED STATES PATENT OFFICE
CERTIFICATE OF CORRECTION

Patent No. 4,170,132           Dated October 9, 1979

Inventor(s) James E. Serley

It is certified that error appears in the above-identified patent and that said Letters Patent are hereby corrected as shown below:

Column 5, line 8, "closed" should be --close--; Column 6, line 32, (Claim 1, line 26), "on" should be --of--.

Signed and Sealed this

Fifteenth Day of January 1980

[SEAL]

Attest:

SIDNEY A. DIAMOND

Attesting Officer      Commissioner of Patents and Trademarks